United States Patent [19]

Falch

[11] Patent Number: 4,515,282

[45] Date of Patent: May 7, 1985

[54] ROTATABLE CRANE APPARATUS FOR A RESCUE VEHICLE

[75] Inventor: Sverre Falch, Moelv, Norway

[73] Assignee: A/S Moelven Brug, Moelv, Norway

[21] Appl. No.: 625,172

[22] Filed: Jun. 26, 1984

Related U.S. Application Data

[63] Continuation of Ser. No. 332,834, Dec. 21, 1981, abandoned.

[30] Foreign Application Priority Data

Mar. 9, 1981 [NO] Norway ................................ 810792

[51] Int. Cl.$^{3}$ ........................ B66C 23/26; B60D 3/12

[52] U.S. Cl. .................................... 212/254; 212/167; 212/211; 212/232; 212/244; 414/561; 414/563

[58] Field of Search ............................... 212/167–168, 212/192, 211, 223, 232, 244, 252, 254; 414/543, 560, 561, 563

[56] References Cited

U.S. PATENT DOCUMENTS

| | | | |
|---|---|---|---|
| 1,254,804 | 1/1918 | Holmes | 414/563 |
| 1,704,882 | 3/1929 | Countryman | 414/563 |
| 1,725,952 | 8/1929 | Beebe | 414/563 |
| 2,082,017 | 6/1937 | McClain | 212/244 |
| 2,383,426 | 8/1945 | Tanenbaum | 414/563 |
| 2,555,663 | 6/1951 | Schouboe | 414/563 |
| 2,951,601 | 9/1960 | Castoe | 414/563 |
| 4,226,331 | 10/1980 | Dumond | 212/261 |
| 4,304,519 | 12/1981 | Hubbard | 212/231 |

FOREIGN PATENT DOCUMENTS

| | | | |
|---|---|---|---|
| 592124 | 2/1960 | Canada | 212/244 |
| 974040 | 9/1975 | Canada | 212/231 |
| 1021150 | 12/1957 | Fed. Rep. of Germany | 212/189 |
| 1655690 | 6/1970 | Fed. Rep. of Germany | 414/563 |
| 2650697 | 11/1978 | Fed. Rep. of Germany | 414/563 |
| 49321 | 2/1939 | France | 212/254 |
| 698473 | 11/1965 | Italy | 212/244 |
| 998806 | 7/1965 | United Kingdom | 212/230 |

*Primary Examiner*—Trygve M. Blix
*Assistant Examiner*—R. B. Johnson
*Attorney, Agent, or Firm*—Holman & Stern

[57] ABSTRACT

A rescue vehicle has a crane boom, hoist winch and rescue winch mounted on a crane turret that is rotatable about a vertical axis. A cable from the respective winches are extended along the crane boom to an associated block that is mounted near the outer end of the boom. Another block is mounted on the bumper of the vehicle to receive the cable from the rescue winch. The rescue winch is ten to twenty times more powerful than the hoist winch. During a vehicle retrieval operation the rescue winch is used to provide the horizontal pulling power while the hoist winch is used to provide the vertical pulling power. A Y-shaped stay bar is mounted on the block on the bumper and is used to support the crane boom at its outer end.

1 Claim, 4 Drawing Figures

ROTATABLE CRANE APPARATUS FOR A RESCUE VEHICLE

This is a continuation of application Ser. No. 332,834, filed Dec. 21, 1981 now abandoned.

BACKGROUND OF THE INVENTION

1. Field of the Invention

The present invention relates to an arrangement on a vehicle with a rotatable crane, comprising a crane boom and associated hoist winch and rescue winch. Such vehicles are made in particular as rescue vehicles for civilian and military use, intended for rescuing vehicles—everything from lightweight automobiles to heavy tanks—which have driven off the road or become stuck in difficult terrain.

2. Description of the Prior Art

Previously known rescue vehicles are built on heavy truck chassis with drive on four or more wheels, and they are provided with cranes and winches for hoisting and hauling, and as a rule they also have support feet to improve stability and to prevent the vehicle from sinking down into the ground or surface on which it stands when said surface has less supporting capacity than, e.g., a roadway.

On previously known rescue vehicles, a rescue winch is mounted on the vehicle with its axis of revolution ordinarily transverse of the longitudinal axis of the vehicle. This means that the cable can be pulled straight out from the winch along the length of the vehicle without having to pass directional pulleys, guide rolls or the like. In such conditions the fixedly mounted winch will work satisfactorily. If, however, it is necessary to haul in a tank, for example, in a direction other than lengthwise along the rescue vehicle, the cable from the winch must be guided in several rather sharp bends in order to come into the desired direction for pulling. Such sharp bends produce great wear on the cable and increase friction so that the pulling power of the winch cannot be utilized fully. Furthermore, situations may also arise in which one wishes to run the cable from the rescue winch over the crane arm or boom of the rescue vehicle, and in such situations it will be necessary, assuming it is possible at all, to apply further sharp bends on the cable.

BRIEF SUMMARY OF THE INVENTION

The object of the present invention is to eliminate the above drawbacks by providing a solution in which the cable from the rescue winch, under all conditions, can run straight out from the winch without any sharp bends, and in the direction from the rescue vehicle which is required in each particular situation.

In accordance with the invention, this is obtained by mounting the rescue winch on the rotatable crane with which the rescue vehicle is equipped. By rotating the crane, then, the rescue winch can at all times be oriented in the most favorable position for the direction in which it is to pull; and even if the crane is provided with its own hoist winch, there may arise a need to use the cable from the rescue winch in the crane, since the rescue winch is always much larger than the hoist winch. For example, the rescue winch may have a pulling power which is from 10–20 times greater than the pulling power of the hoist winch.

When the rescue winch is arranged on the rotatable crane, moreover, the cable from the rescue winch can be made to pass over a loose block on the crane arm or boom while the hoist winch cable runs along the crane arm in the normal manner, and it then becomes possible for the rescue winch cable to haul in a vehicle while the hoist winch cable lifts one end of the same vehicle.

The rescue winch can also be utilized for rescuing its own type of vehicle, or for rescuing itself, with the rescue cable then running over the crane arm down toward a block at about the same height as the bumper of the vehicle.

BRIEF DESCRIPTION OF THE DRAWINGS

The invention is characterized by the features recited and will be explained in greater detail in the following with reference to the drawings, wherein.

DETAILED DESCRIPTION

Figure 1:
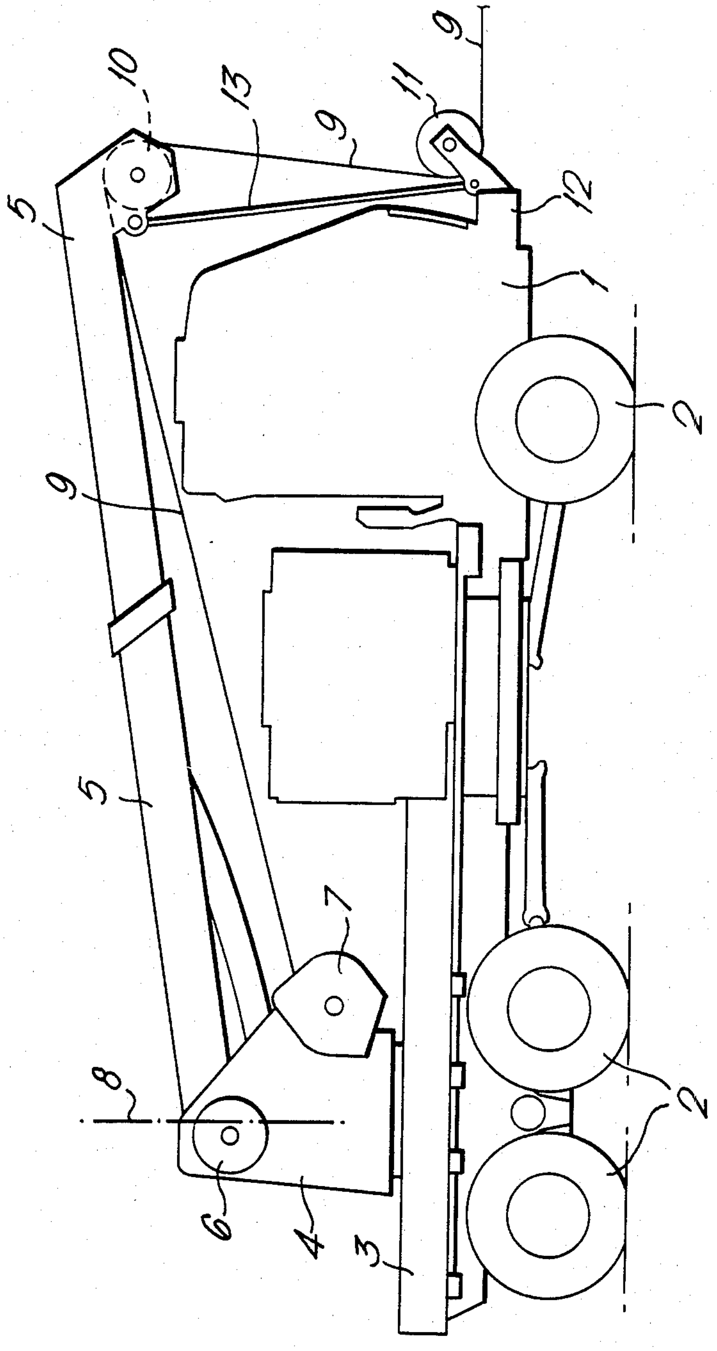
FIG. 1 is a side elevational schematic view of a rescue vehicle depicted in a highly simplified manner.

FIG. 1 shows a vehicle 1 with wheels 2 and the rescue trailer/vehicle frame 3. Associated equipment such as, e.g., feet, support legs and other rescue trailer equipment, are not shown on the drawing in the interest of simplicity.

Figure 2:
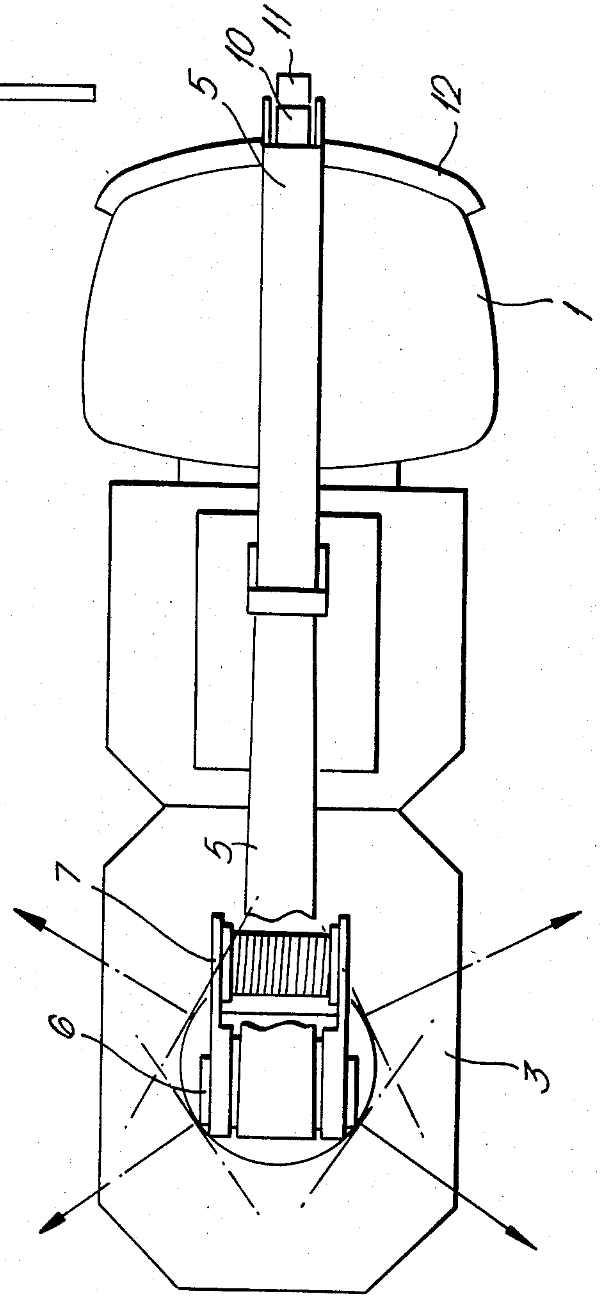
FIG. 2 is a top plan view of the vehicle of FIG. 1.

A rotatable crane base or turret 4 with crane arm, or boom, 5 and hoist winch 6 is mounted on the frame 3. These components are of conventional embodiment, and that which characterizes the invention is that the rotatable crane, in addition to said conventional equipment, also carries a rescue winch which may be moved together with the crane 4, 5 when the latter rotates about its vertical axis 8. With the rescue winch 7 disposed on the crane 4, 5, it is thereby possible, as shown by the arrows in FIG. 2, to draw the rescue winch cable 9 directly off the winch 7 in the direction required in each individual situation. Direct pull from the winch 7 reduces friction and wear on the cable quite substantially, as compared to previously known rescue vehicles in which the cable, to obtain the correct direction, had to pass in sharp bends about one and even two directional pulleys. With the rescue winch 7 disposed on the rotatable crane 4, 5 itself, it is also possible to allow the cable from the rescue winch to operate as a crane cable when there is a need for this. The pulling power of the rescue winch is many times greaater than that of the hoist winch 6, being perhaps ten or even twnety times greater.

In a practical embodiment, the hoist winch 6 is capable of hoisting 1.5 tons on a single cable, whereas the pulling power of the rescue winch on a single cable, is 20 tons.

Figure 4:
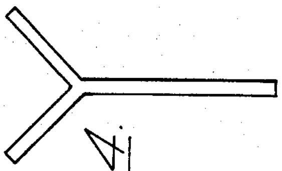
FIG. 4 is an elevational view of a stay bar used with the invention.

Thus, if the rescue vehicle itself has become stuck, it is capable of self-rescue by letting the rescue cable operate as a crane cable. The rescue cable 9, as shown in FIG. 1, is in that case passed over the block 10 at the free end of the crane arm or boom 5 and over a loose block 11 disposed on the bumper 12, preferably mounted on the hitch attachment that is normally found on the bumper. A stay bar 13, preferably Y-shaped as shown in FIG. 4, then supports the free end of the crane. The stay bar 13 may be the towing/pulley bar which the rescue vehicle is equipped with in any case, and the cable 9 continues to a suitable fastening point in the terrain.

Figure 3:
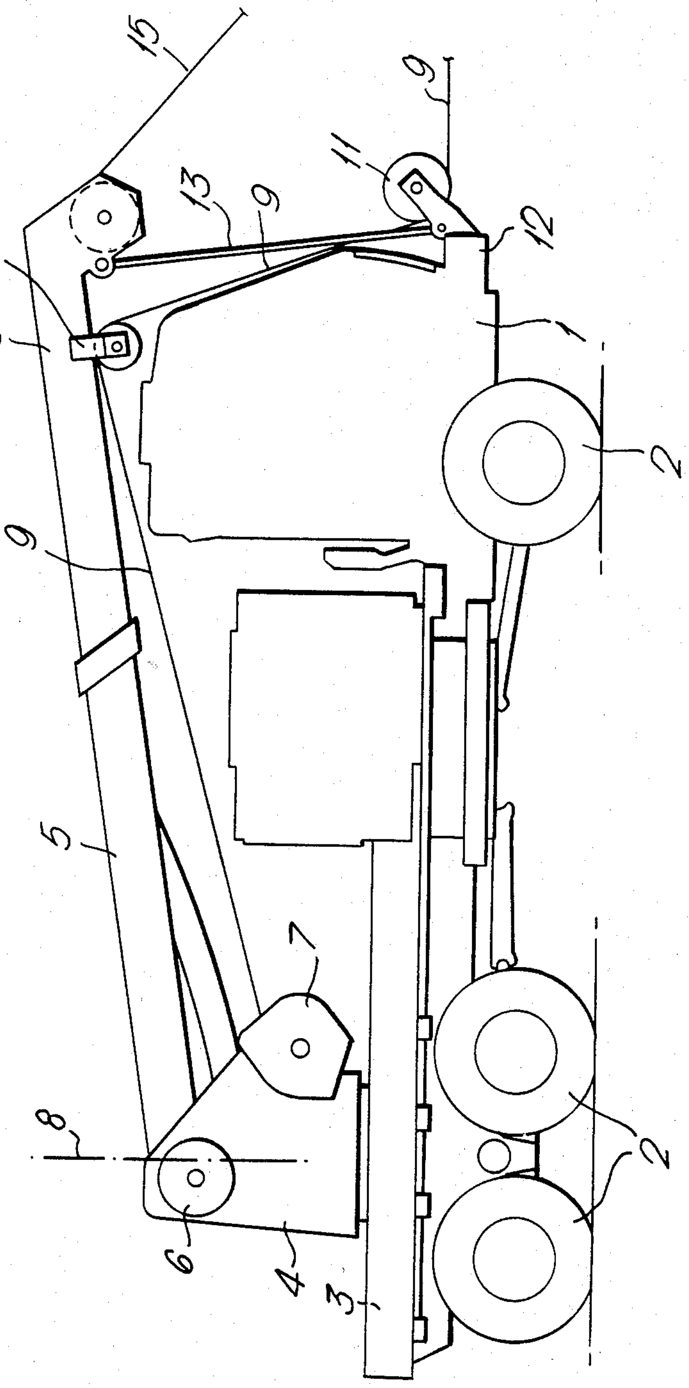
FIG. 3 is a view similar to FIG. 1, but showing the cables arranged in a different path.

When it is necessary to haul in a stranded vehicle while lifting one end of the vehicle at the same time, the cable 9 from the rescue winch 7 is also led via the crane arm 5, but in this case it then passes over a detachable block 14 near the end of the arm, as shown in FIG. 3, and continues down to pass under the block 11 at the front of the vehicle 1. At the same time, the crane's normal hoist cable 15 runs out over the block 10 at the end of the crane arm.

The rescue winch cable 9 then provides the necessary horizontal pulling power, while the hoist winch 6 and cable 15 provide the vertical, upwardly directed component for raising the vehicle as it is being hauled in.

The embodiment illustrated herein serves only to illustrate the invention, and other embodiments can easily be imagined within the scope of the present invention, the only condition being that the rescue winch 7 is attached to the rotatable crane of the vehicle or to another rotatable member so as to permit adjustment of the rescue winch cable in the most suitable way in any given situation.

Having described my invention, I claim:

1. A rescue vehicle having a wheeled frame, a front bumper attached to said frame, a crane apparatus including a crane turret mounted on said frame for rotation about a vertical axis, a crane boom having an inner and an outer end with the inner end mounted on said crane turret, a block mounted on said outer end, a hoist winch means for providing vertical pulling power mounted on said turret adjacent the inner end of the boom and a hoist cable wound thereon running substantially along said boom and over said block; a rescue winch means for providing horizontal pulling power and having 10–20 times greater power than said hoist winch means mounted on said turret adjacent to and substantially below said inner end of said boom;

a rescue cable operatively wound on said rescue winch means and extending therefrom beneath said boom in the general direction toward said block;

a detachable first rescue cable block mounted on said boom near said outer end thereof at a distance from said axis less than said block; said rescue cable running over said first rescue cable block to be guided thereby;

a second rescue cable block mounted on said front bumper and over which said rescue cable extends after passing over said first-mentioned rescue cable block in a general horizontal direction extending outwardly from the vehicle; and a Y-shaped stay bar means mounted on said second rescue cable block for engaging said boom near the outer end thereof and to support said boom.

* * * * *